United States Patent [19]

Salanki et al.

[11] Patent Number: 4,613,727
[45] Date of Patent: Sep. 23, 1986

[54] ELECTRICAL INSULATOR COLUMN WITH FIBER OPTIC CABLE AND GAS SUPPLY TUBE

[75] Inventors: Tibor Salanki, Erlangen; Norbert Hess, Wiesenthau, both of Fed. Rep. of Germany

[73] Assignee: Siemens Aktiengesellschaft, Munich and Berlin, Fed. Rep. of Germany

[21] Appl. No.: 755,175

[22] Filed: Jul. 15, 1985

[30] Foreign Application Priority Data

Jul. 18, 1984 [DE] Fed. Rep. of Germany ....... 3426536

[51] Int. Cl.$^4$ .................... H01B 17/14; H01B 17/36; G02B 6/00
[52] U.S. Cl. .................................... 174/30; 174/139; 174/150
[58] Field of Search ............... 174/30, 139, 140 R, 174/141 R, 150, 177, 178, 179; 324/96; 455/612

[56] References Cited

U.S. PATENT DOCUMENTS

| | | | |
|---|---|---|---|
| 3,485,940 | 12/1969 | Perry et al. ......................... | 174/139 |
| 3,509,267 | 4/1970 | Jensen .................................. | 174/30 |
| 4,409,428 | 10/1983 | Dey et al. ......................... | 174/139 X |

FOREIGN PATENT DOCUMENTS

| | | |
|---|---|---|
| 2017283 | 10/1971 | Fed. Rep. of Germany . |
| 2716922 | 10/1978 | Fed. Rep. of Germany ...... 174/139 |
| 2901872 | 7/1980 | Fed. Rep. of Germany . |
| 3207306 | 9/1983 | Fed. Rep. of Germany ...... 174/177 |
| 872753 | 2/1942 | France . |
| 2118991 | 8/1972 | France . |
| 434420 | 10/1967 | Switzerland . |

Primary Examiner—Laramie E. Askin
Attorney, Agent, or Firm—F. W. Powers; J. L. James

[57] ABSTRACT

Hermetically sealed fiber optic cables (LW) are conducted through an insulator column consisting of several hollow insulators. The fiber optic cables (LW) are fastened to a support element (TE), whose one end is connected to the reference potential and whose other end is connected to a high voltage. The support element (TE) is characterized by a surface having only limited electrical conductivity. This assures that, as a result of the even field strength distribution thus guaranteed, no impermissibly high voltages are impressed on the fiber optic cable (LW). A non-conductive tube (GV) for conveying gas is wound around the support element (TE).

6 Claims, 2 Drawing Figures

ELECTRICAL INSULATOR COLUMN WITH FIBER OPTIC CABLE AND GAS SUPPLY TUBE

BACKGROUND OF THE INVENTION

This invention relates to the field of insulators for high voltage transmission systems and more particularly to an electrical insulator column insulating a high voltage carrying assembly from an electrical reference potential while also communicating a fiber optic cable and a gas tube between the reference potential and the assembly.

Electrical insulator columns as supports for high voltage carrying assemblies are standard commercial item 5. For conducting control signals from the site of the reference potential to the high voltage conducting components, or for conducting feedback signals from the components to the site of the reference potential, it is possible to utilize fiber optic cables for the signal transmission.

It is the object of this invention to provide an electrical insulator column of the type specified above in which the fiber optic cables are mechanically protected and can be conducted from the site of the reference potential to the site of the high voltage without any reduction of the dielectric strength of the system. It is a further object of this invention to provide an electrical insulator column through which a supply of gas at a positive pressure can be conducted without any reduction of the dielectric strength of the system from the site of the reference potential to the site of high voltage.

SUMMARY OF THE INVENTION

In accordance with one aspect to this invention, the foregoing objects are achieved by providing an electrical insulator column consisting of one or more hollow insulators which are hermetically sealed and filled with an insulating material. This electrical insulator column provides mechanical support and electrical insulation of a high voltage carrying assembly from a reference. Conducted through this insulator column in a hermetically sealed manner is one or more fiber optic cables between the high voltage carrying assembly and the reference potential. Providing fixed-mounted support for the one or more fiber optic cables is a support element which has a surface conductivity which enables the support element to withstand the potential difference it spans.

This permits an even voltage distribution along each fiber optic cable which can be further enhanced by having, in accordance with a preferred embodiment of the invention, the material of the surface of the support element be characterized by a declining specific impedance as the electrical field strength increases. Moreover, a conducting of a straight, unwound fiber optic cable is possible. Winding of the fiber optic cable would be advantageous from the perspective of dielectric strength; however, from a mechanical and transmission perspective, the deformation required of the fiber optic cable would be disadvantageous; in particular, the increased length of a wound fiber optic cable in contrast to a straightly conducted routing would substantially increase the attenuation of the transmission path. In addition, at least one tube, which is hermetically sealed against the insulating material and electrically non-conductive, can be wound through the insulator column from the site of the reference potential to the location of the assembly. Thus, aside from light transmission, a medium as well can be transported, whose dielectric strength is lower than the dielectric strength of the insulating material incorporated in each hollow insulator.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENTS

Figure 1:
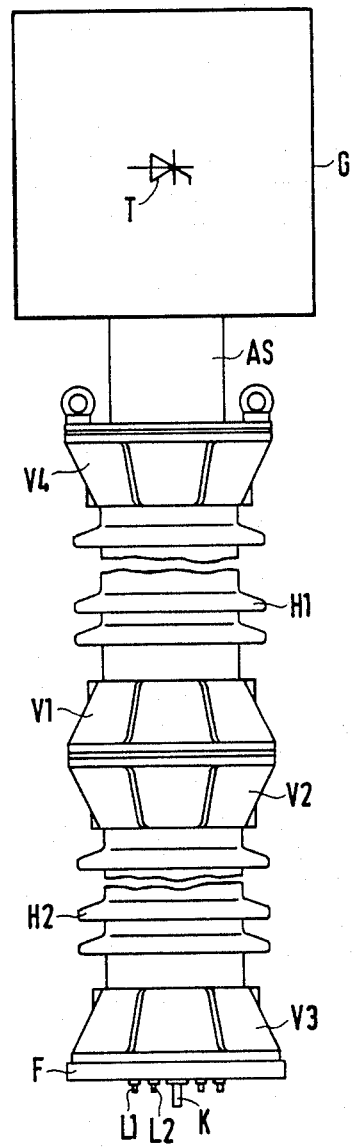
FIG. 1 is an exterior view of the insulator column.

The depiction in FIG. 1 shows an insulator column which for simplicity's sake is shown only in sections, with hollow compartment insulators H1 and H2 filled with insulating material, e.g., compressed nitrogen gas, which are connected to each other in a gas-tight arrangement by junctions V1 and V2. The end of hollow compartment insulator H2 facing away from hollow compartment insulator H1 has a flange F connected to a junction V3, to which gas-tight fiber optic cable connections, e.g. the cable connections L1 and L2 as well as a similarly gas-tight connection K for a supply of gas, with a slight atmospheric positive pressure, to be further explained below, are connected. The end of the hollow compartment insulator H1 facing away from the hollow compartment insulator H2 has a junction V4 to which again a connecting member AS is mounted which is connected in a sealed fashion by means of a non-hermetically sealed housing G as the support of electrical assemblies which, for example, could include thyristors T. The connecting member AS fully seals the insulator column and also serves for the sealed conductance of the supply of gas and the beam wave guide. For simplicity's sake, said conducting arrangements are not shown.

Figure 2:
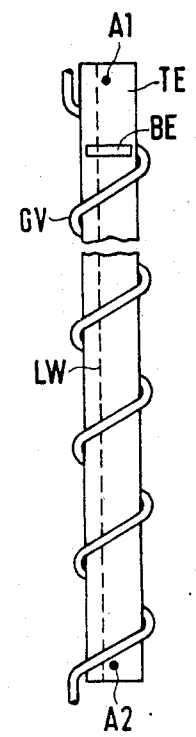
FIG. 2 illustrates the elements in the interior of the insulator column.

The depiction in FIG. 2 diagrams those elements which serve to transmit the light signals supplied over cable connections L1 and L2 to the assemblies installed in housing G and which are designed to transmit a gas such as air with a slight positive pressure relative to atmospheric pressure into the housing G.

Said elements include, among others, the support element TE which has a linear-shaped configuration and which is conducted inside of the insulator column by spacers. Around the support element TE is wound a gas-supply tube GV which is made of insulating material. Moreover, along the support element TE a number of cables are placed, of which only one such cable LW is shown in broken lines. The mounting of the support element and thus also of the cable LW is handled by the use of contacting fastening elmeents BE, only one of which has been shown for simplicity's sake. The support element TE consists of insulating material coated by a lacquer having only limited electrical conductivity, with the specific impedance of the lacquer dropping as the field strength increases. This assures that an even voltage distribution prevails, both along the cables, e.g., light guide LW, as well as along the gas-supply tube GV. For said purpose the support element TE, shown in a truncated schematic, is connected via connection A2 to the side conducting the electrical reference potential with said reference potential and connected to the high-voltage conducting side over a connection A1 with the high voltage potential. It will now be understood that there has been disclosed an improved insulating column for the conveyance of a gas-supply and light signals.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured as Letters Patent of the United States is:

1. An electrical insulator column having at least one hermetically sealed, hollow insulator filled with an insulating material providing mechanical support and insulation from a reference potential of a high voltage carrying assembly, comprising:
   at least one fiber optic cable conducted through the electrical insulator column in a hermetically sealed manner; and
   a support element, providing fixed-mounted support for the fiber optic cable, fixedly mounting to the insulator column, and having a limited electrical conductivity surface enabling the support element to withstand the potential difference of being connected between the high voltage of the site of the assembly and the reference potential site.

2. An insulator column according to claim 1, wherein the support element limited electrical conductivity surface is comprised of a material having a specific impedance which decreases as the electric field strength increases.

3. An insulating column according to claim 2, further comprising at least one electrically non-conductive tube, hermetically sealed against the intrusion of the insulating material, winding through the insulator column from the site of the assembly to site of the reference potential.

4. An insulator column according to claim 3, wherein each electrically non-conducting tube is fixedly mounted to the support element.

5. An insulating column according to claim 1, further comprising at least one electrically non-conductive tube, hermetically sealed against the intrusion of the insulating material, winding through the insulator column from the site of the assembly to site of the reference potential.

6. An insulator column according to claim 5, wherein each electrically non-conducting tube is fixedly mounted to the support element.

* * * * *